Patented May 5, 1942

2,282,002

UNITED STATES PATENT OFFICE 2,282,002

METHOD OF INCORPORATING POLYMERIZED ALIPHATIC MONO-OLEFINS IN POLYMERIZED STYRENE

Thomas Robertson Scott and Malcolm Clifford Field, London, England, assignors to International Standard Electric Corporation, New York, N. Y.

No Drawing. Application November 3, 1938, Serial No. 238,704. In Great Britain November 9, 1937

12 Claims. (Cl. 260—42)

This invention relates to electrical insulating materials particularly insulating materials for use in connection with cables and other conductors.

It has been appreciated for some years that polymerized aromatic mono-olefins such as polymerized vinyl benzene (polystyrene) have extremely desirable electrical characteristics, e. g. an extremely low power factor. On the other hand it sometimes happens that an insulating material is required having a greater toughness and flexibility than that of polystyrene and, therefore, attempts have been made to produce a tough and flexible composition containing polystyrene and having electrical characteristics not greatly inferior to pure polystyrene. In this connection in our prior Patent No. 357,624 we have described an insulating material comprising pure rubber admixed with between 40% and 80% of a synthetic hydrocarbon polymer, e. g. polystyrene, and up to 20% of an additional substance such as hydrocarbon wax. This composition produces a satisfactory flexible insulating material.

It has now been found that polymerized aliphatic mono-olefins and particularly polymerized iso-butylene have superior electrical characteristics to rubber and at the same time provide physical properties closely analogous thereto. That is to say, the toughness and flexibility of polymerized iso-butylene closely approximates to rubber whilst the electrical properties of polymerized iso-butylene are superior.

In accordance with the present invention, therefore, we provide an electrical insulating material comprising a polymerized aliphatic mono-olefin admixed with a polymerized aromatic-olefin (e. g. aromatic mono-olefin or di-olefin). Among the aliphatic mono-olefins that may be employed, polymerized isomers of ethylene, butylene, propylene, amylene, hexylene, heptylene, octylene, nonylene and decylene may be mentioned. In particular, polyiso-butylene and polyethylene due to their relative cheapness, their ease of polymerization and their satisfactory electrical and physical characteristics give very satisfactory results. Further polystyrene is an extremely satisfactory aromatic compound and therefore in accordance with a feature of the present invention there is provided an insulating material comprising polystyrene admixed with polymerized iso-butylene or polyethylene. Preferably 20% to 60% of polymerized iso-butylene or polyethylene would be employed with 80% to 40% of polystyrene if a flexible product were required. The materials may be polymerized or partially polymerized separately and then mixed in heated condition or alternatively the polymerized aliphatic mono-olefin may be dissolved in the aromatic olefin when in monomeric form, and the mixture then polymerized with occasional agitation to retain homogeneity. Another satisfactory method of mixing the materials is to dissolve them in a common solvent, the polymeric material produced by any of the above methods may be milled in order to increase the homogeneity of the resulting product. If desired, additional substances may be added to the composition forming the insulating material, for example, a desired percentage of the poly-iso-butylene may be replaced by rubber, balata, gutta percha, high melting point hydrocarbon wax, colouring material or other desired substance or substances to impart a desired property or characteristic to the resulting insulating material.

It is believed that in the polymerization of the aliphatic mono-olefins a substantially saturated polymer is produced with the elimination of most of the double bond and, therefore, by a discriminating selection of aliphatic-mono-olefins or mixture of olefins and by the control of the conditions of polymerization, e. g. temperature, polymerized products may be obtained which provide a range of physical characteristics from a viscous liquid to a solid elastic material. One of the best criterion for differentiating the polymerization products from each other and for serving as an index of the physical characteristics of the polymerization product is the molecular weight as determined by the Staudinger viscosity method. Polymerized aliphatic mono-olefins having a molecular weight of between 10,000 and 200,000 as determined by the Staudinger method are preferred for electrical insulation.

Another way to increase the toughness and flexibility of the resulting electrical insulating material in accordance with a further feature of the present invention is to add suitable plasticizers to the constituents, for example in the case of polystyrene suitable plasticizers are set out in our specification No. 490,814 for example phenanthrene and amyl naphthalene may be mentioned. An amorphous mineral wax having a melting point of about 160° F. may be employed to plasticize the poly-iso-butylene and suitable rubber plasticizers may also be employed when rubber is included in the insulation.

Experimental results have shown that a range of polymers having progressively changing physical properties may be produced. A series of experiments was carried out upon the polymers produced by admixtures of poly-iso-butylene and polystyrene. The polyisobutylene was cut into small pieces and varying percentages were added to monomeric styrene in a container which was then sealed. It may be mentioned that it was found that solution did not readily take place at room temperature but was easily effected if the temperature was elevated. The solutions were then polymerized for about 2 days at 120° C. the solutions being agitated from time to time in order to produce homogeneous products. When polymerization was complete the blocks of polymer were removed from the containers, heated to render them soft and workable and then sheeted by passing them through hot rolls. Certain of the polymers containing over 30% of polyisobutylene were rubbery and were therefore moulded at 170 C. under pressure. Details of certain of the polymers are given below in tabular form, the polymers being produced by the addition to styrene of varying percentages of polyisobutylene of molecular weight about 200,000.

2% of polyisobutylene—A nearly uniform white solid was produced which gave a rather brittle sheet not unlike a sheet of polystyrene.
5% of polyisobutylene—This also produced a nearly uniform white solid from which a tougher and less brittle sheet was manufactured.
10% of polyisobutylene—The sheet produced from this polymer showed little or no increase in toughness over that of the 5% polymer but the increase in flexibility was appreciable.
20% of polyisobutylene—This gave a sheet which was rather weaker than that produced from the polymers containing lower percentages of polyisobutylene and there was little increase in flexibility over the 10% product.
40% of polyisobutylene—A flexible polymer was produced not unlike raw rubber in appearance. This polymer showed a good performance when tested for recovery after stretching.

All the above polymers were progressively more powdery after milling and all could be satisfactorily moulded though hot rolling was more satisfactory for those containing the lower percentage of polyisobutylene. A similar series of experiments was also carried out on admixtures containing percentages of polyisobutylene of lower molecular weight (i. e. about 100,000) and somewhat surprisingly the results produced showed an increase in flexibility of the polymers, the 10% polymer being definitely rubbery. The polymers produced were not so homogeneous as the polymers produced in the experiments previously described but after milling uniform products were produced. After milling and before sheeting the following results were obtained.

2% of polyisobutylene—coherent powdery material.
5% of polyisobutylene—coherent flaky material.
10% of polyisobutylene—powdery material showing rubberlike characteristics.
20% of polyisobutylene—similar to the polymer containing 10% of polyisobutylene but more rubbery.
40% to polyisobutylene—very rubbery material with good recovery after stretching.

From the milled polymers products were produced which showed an increase of flexibility over the corresponding products produced from polymers containing the polyisobutylene of higher molecular weight.

Experiments were also carried out upon the products produced by the admixture of polyethylene with styrene and the following results were obtained:

2% of polyethylene—a non-uniform polymeric material produced which was milled into uniformity. The sheet produced was less brittle than polystyrene sheet and when broken the fracture resembles that produced in rubber-styrene sheet.
5% of polyethylene—rather more flexible than the 2% product.
10% of polyethylene—rather weaker than the 2% product.
40% of polyethylene—a rubbery elastic solid was produced which showed high tensile strength and a good recovery after a 100% elongation.

It will be understood from the above results that a range of polymers are produced from which may be selected the product having the desired properties. If desired wax or the like may be admixed with the polymers for example insulating material comprising 30% polyisobutylene (molecular weight 200,000), 7% wax and 63% polystyrene, polymerization being carried out at 120° C. for 36 hours gives a uniform solid and after milling gives a soft elastic product with rather slow recovery after deformation.

The insulating material in accordance with the present invention may be utilized in many ways, for example, to form spacing means for coaxial cables including separating discs and helical tubes or rods in which case a flexible product containing between 10% and 30% of the aliphatic mono-olefin should be employed. The material may also be formed into sheets, ropes or films, may be used to impregnate tapes such as papers; to form the insulation as described in our copending application No. 12,708/37 which relates to gas pressure cables; to form an insulating sleeve or extruded covering around a conductor for power and/or high frequency alternating current transmission and may be employed in condensers, dielectric wave guides and so on. The invention therefore includes an electric conductor or conductor cable provided with insulating material of the form described. It may be further mentioned that insulating material in accordance with the present invention is not limited in its application to the uses mentioned above but has a broad application in connection with electrical apparatus.

What is claimed is:

1. A method of incorporating polymerized aliphatic mono-olefins in polymerized styrene which comprises dissolving the polymerized aliphatic mono-olefin in monomeric styrene and then polymerizing the styrene.

2. A method of incorporating polymerized aliphatic mono-olefins in polymerized styrene which comprises dissolving between about 2% and 60% of a polymerized aliphatic mono-olefin in monomeric styrene and then polymerizing the styrene.

3. A method of incorporating polymerized aliphatic mono-olefins in polymerized styrene which comprises dissolving the polymerized aliphatic mono-olefin in monomeric styrene and then polymerizing the styrene by heating the mixture.

4. A method of incorporating polymerized aliphatic mono-olefins in polymerized styrene which comprises dissolving between about 2% and 60% of a polymerized aliphatic mono-olefin in monomeric styrene and then polymerizing the styrene by heating the mixture.

5. A method as in claim 1 wherein the polymerized aliphatic mono-olefin is polymerized isobutylene.

6. A method as in claim 2 wherein the polymerized aliphatic mono-olefin is polymerized isobutylene.

7. A method as in claim 3 wherein the polymerized aliphatic mono-olefin is polymerized isobutylene.

8. A method as in claim 4 wherein the polymerized aliphatic mono-olefin is polymerized isobutylene.

9. A method as in claim 1 wherein the polymerized aliphatic mono-olefin is polymerized ethylene.

10. A method as in claim 2 wherein the polymerized aliphatic mono-olefin is polymerized ethylene.

11. A method as in claim 3 wherein the polymerized aliphatic mono-olefin is polymerized ethylene.

12. A method as in claim 4 wherein the polymerized aliphatic mono-olefin is polymerized ethylene.

THOMAS ROBERTSON SCOTT.
MALCOLM CLIFFORD FIELD.